Oct. 8, 1935.  M. E. CHEADLE  2,016,987
MOWING MACHINE
Filed Dec. 8, 1933
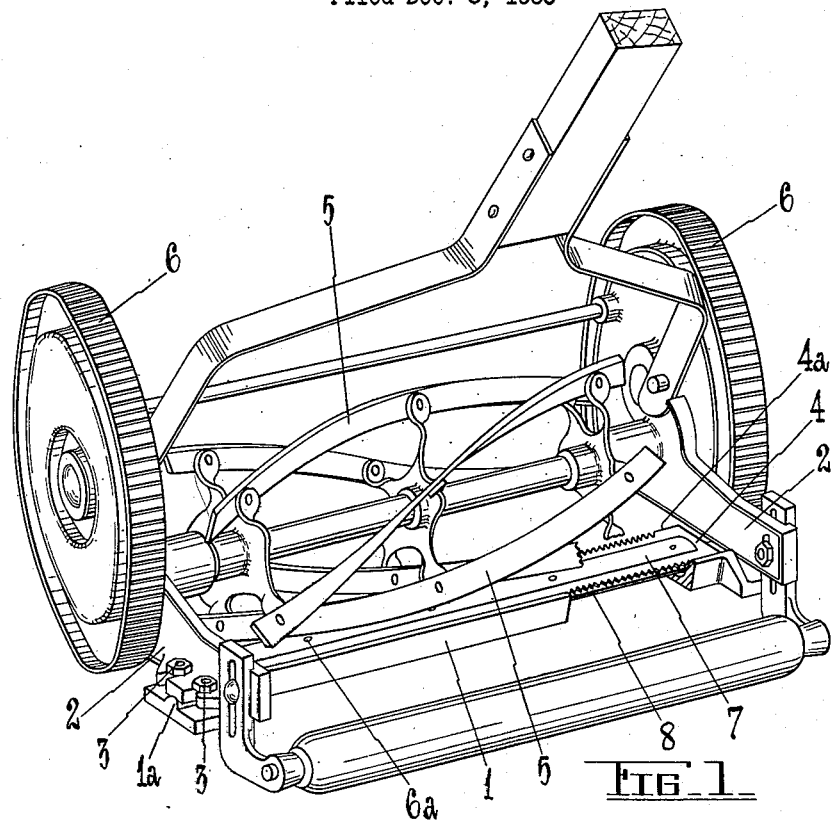
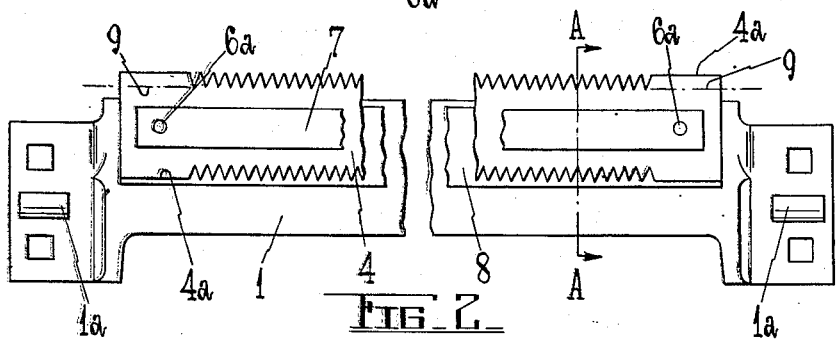
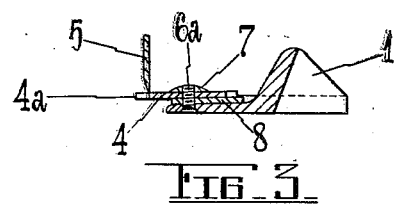
M. E. Cheadle
INVENTOR
by Mark & Clerk
ATTYS.

Patented Oct. 8, 1935

2,016,987

UNITED STATES PATENT OFFICE 2,016,987

MOWING MACHINE

Marion Elizabeth Cheadle, Auckland, New Zealand

Application December 8, 1933, Serial No. 701,525

1 Claim. (Cl. 56—294)

The invention relates to mowing machines of the type provided with a rotary cutter operable about an axis parallel to, and in conjunction with, a horizontal fixed cutting blade, mounted to travel along the ground a short distance above the surface thereof.

In mowing machines of this type it is customary to form the fixed cutting blade with a plain leading edge with the upper corner of which the blades of the rotary cutter contact while moving rearwardly of the machine below the axis about which they rotate.

Owing to the helical formation of the blades of the rotary cutter there is always present the tendency of the grass or the like to be beaten down in a direction sideways of the machine without being cut, this fault being particularly noticeable should the fixed blade not be set correctly in relation to the rotary blades, or if the co-acting blade edges are worn or incorrectly ground.

The object of the invention is therefore to provide in the beforementioned type of mowing machine, improvements designed to increase the cutting efficiency thereof, besides also giving longer life to the cutting edges and providing a measure of self-adjustment of the fixed blade in relation to the rotary blades, and allowing for the passage of small obstructions likely during use of the machine to be picked up and prevent same from operating, besides being liable to damage the machine.

According to the invention the improvements consist in providing in a mowing machine of the type specified and in combination with a rotary cutter forming part thereof, a horizontal fixed blade having a toothed leading edge and set so that the point of contact of the blades of the rotary cutter, with the horizontal fixed blade is along a line passing through the roots of the teeth of the horizontal fixed blade.

Provision is made for reversing the horizontal fixed blade, and also for rendering the same resilient to the rotary cutter.

In the accompanying drawing in conjunction with which the invention will be more particularly described Figure 1 is a perspective view (broken) of a mowing machine fitted with the improvements Figure 2 a plan view of the fixed blade thereof and Figure 3 a cross sectional view on the line A—A Figure 2.

Referring to the drawing, 1 is the fixed blade carrier which is pivotally mounted between the side frames 2 of the machine and is adjustable on its pivots 1a by means of the adjusting screws 3.

The fixed blade 4 is formed from sheet steel and is of rectangular formation, both of the parallel longer edges 4a containing teeth each of which has the same degree of taper or inclination at each side.

The blade 4 is mounted and secured on the pivoted carrier 1 so that one of its toothed edges 4a is located forwardly of the latter and below the blades 5 of the rotary cutter which is driven from the running wheels 6 of the machine in the usual way.

In adjusting the blade 4 in relation to the blades 5 of the rotary cutter, said blade 4 is positioned so that the blades 5 contact therewith on the upper side of the blade 4 along a line 9 passing through the roots of the teeth on the forward or leading edge, or through the innermost points of the recesses or spaces between said teeth.

The teeth are provided on the blade 4 to hold the grass or the like against the tendency to be beaten down or swept along the fixed blade 4 by the action of the rotary cutter, due to the helical formation of the blades 5, thereby ensuring not only cutting of the grass or the like, but closer and cleaner cutting of same.

By making the teeth of the forward or leading edge of the blade 4 extend in advance of the point of contact of the blades 5 therewith, said teeth also act as a comb or rake and pick up separate and bring to the cutting position, grass or the like not standing in the path of travel of the machine.

The blade 4 is detachably secured to the carrier 1 by screws 6a so that it can be reversed edge for edge, or/and side for side as required, which means that said blade can be used to provide four separate cutting edges or wearing points, and after all of the latter have been worn they can be restored by filing or sharpening the teeth.

The blade 4 can be made slightly resilient or it can be clamped between a bar 7 and the carrier 1 with a thickness 8 of rubber or other resilient material between said bar 7 and said carrier 1, the object of the resiliency being to allow the blade 4 to give slightly and permit the passage of small pieces of wood, nails, small stones and the like picked up by the rotary cutter, thereby avoiding blockage of the machine, and minimizing risk of injury.

What I do claim and desire to obtain by Letters Patent of the United States of America is:—

In a mowing machine of the type specified, the combination with a pivoted carrier of a reversible blade having opposed toothed edges, a strip of rubber arranged directly on the carrier beneath the blade so as to provide a cushioned support for the blade, said blade having its operating toothed edge projecting beyond the carrier and strip and adapted to cooperate with the rotary cutter of a mowing machine, a relatively narrow and elongated clamping bar arranged on top and medially of the blade and having its marginal edges spaced from the toothed edges of the blade, and detachable fastening devices engaging the opposite ends of the bar, the strip, the blade and the carrier for releasably securing the parts to the carrier.

MARION ELIZABETH CHEADLE.